Aug. 27, 1946.  H. NIERE  2,406,432
POULTRY FEEDER
Filed Jan. 26, 1944  2 Sheets-Sheet 1

Inventor
Herman Niere

By Clarence A. O'Brien
and Harvey B. Jacobson
Attorneys

Aug. 27, 1946.  H. NIERE  2,406,432
POULTRY FEEDER
Filed Jan. 26, 1944  2 Sheets-Sheet 2

Inventor
Herman Niere
By Clarence A. O'Brien
and Harvey B. Jacobson
Attorneys

Patented Aug. 27, 1946

2,406,432

UNITED STATES PATENT OFFICE 2,406,432

POULTRY FEEDER

Herman Niere, St. Louis, Mo.

Application January 26, 1944, Serial No. 519,800

1 Claim. (Cl. 119—62)

This invention relates to new and useful improvements in poultry feeders of the fowl-excluding type, and has for its primary object to provide, in a manner as hereinafter set forth, a device of this character which is adapted to be opened by the weight of one or more fowls desiring to feed therefrom and which, further, will close by gravity when the fowls leave.

Another very important object of the invention is to provide, in a poultry feeder of the aforementioned character, comprising a housing and a trough mounted therein, a novel construction and arrangement whereby said trough may be expeditiously removed for cleaning or other purposes.

Other objects of the invention are to provide a poultry feeder of the character described which will be comparatively simple in construction, strong, durable, highly efficient and reliable in use, compact and which may be manufactured at low cost.

All of the foregoing, and still further objects and advantages of the invention, will become apparent from a study of the following specification, taken in connection with the accompanying drawings wherein like characters of reference designate corresponding parts throughout the several views, and wherein:

Figure 4 is a bottom plan view of one of the vertically swinging closures.

Figure 1:
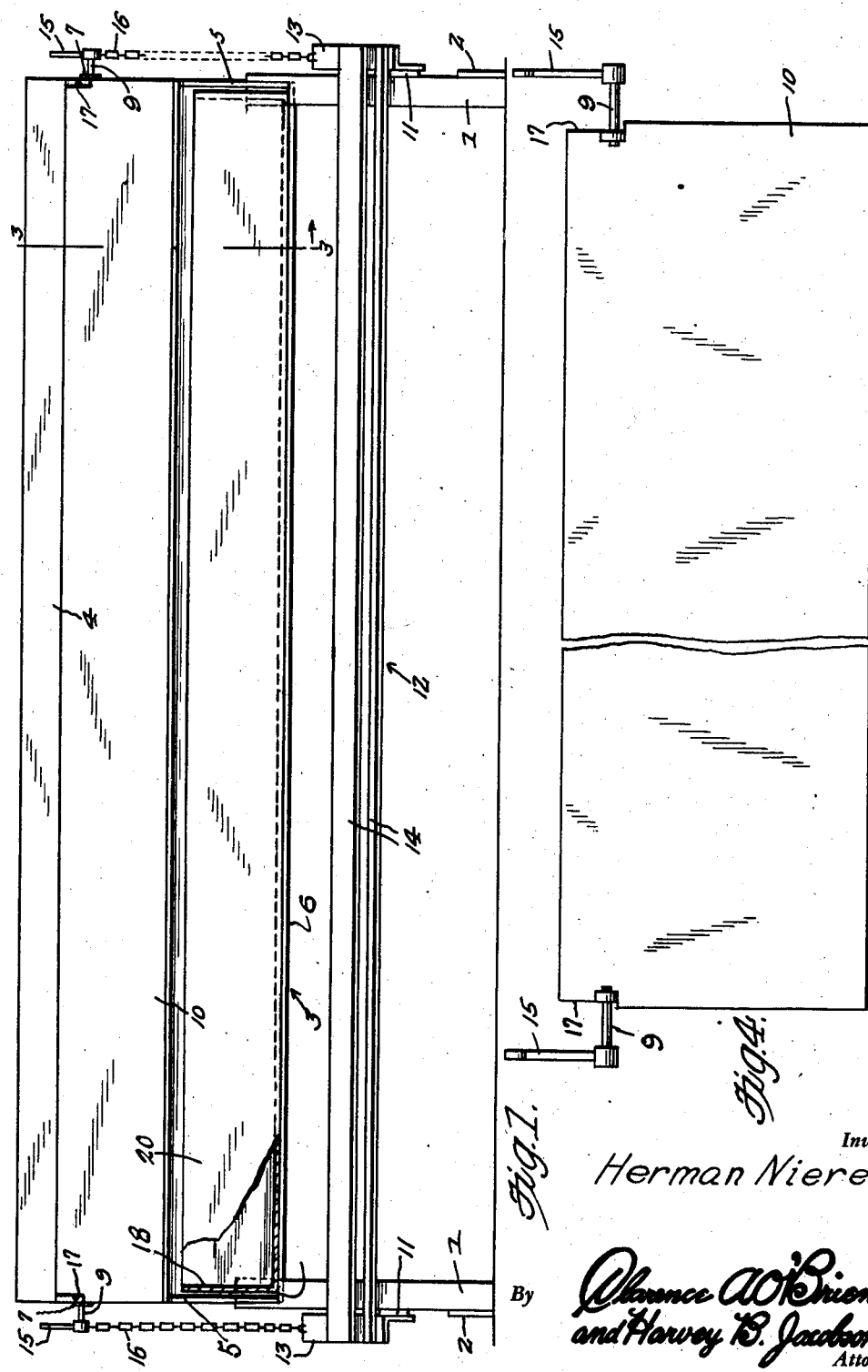
Figure 1 is a view in side elevation of a poultry feeder constructed in accordance with the present invention, showing a portion of the removable trough broken away in section.
Figure 2:
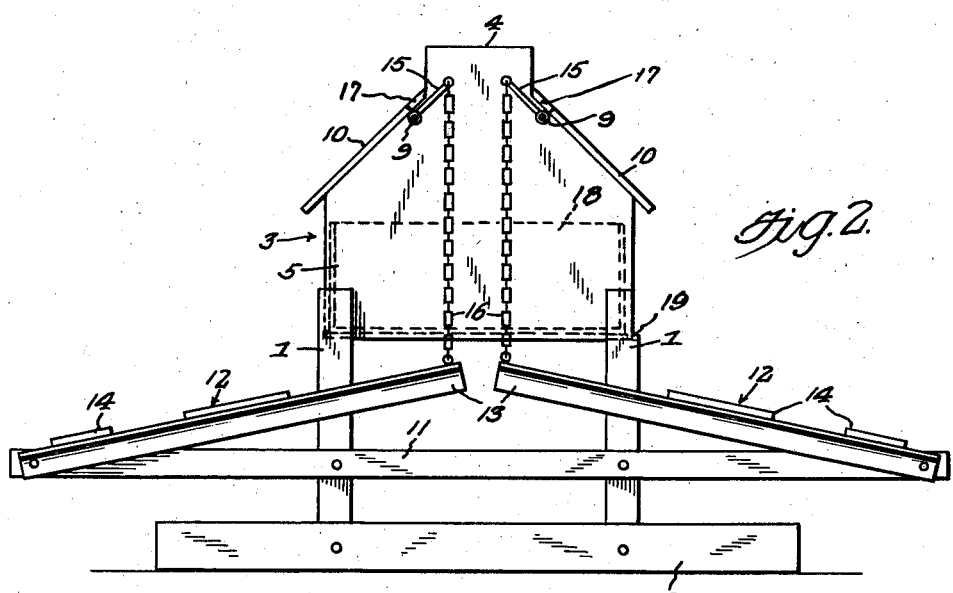
Figure 2 is a view in end elevation of the device.

Referring now to the drawings in detail, it will be seen that the embodiment of the invention which has been illustrated comprises a plurality of supporting legs 1 of angle iron. Mounted transversely on the lower end portions of the legs 1 are feet 2 in the form of bars of wood or other suitable material.

Figure 3:
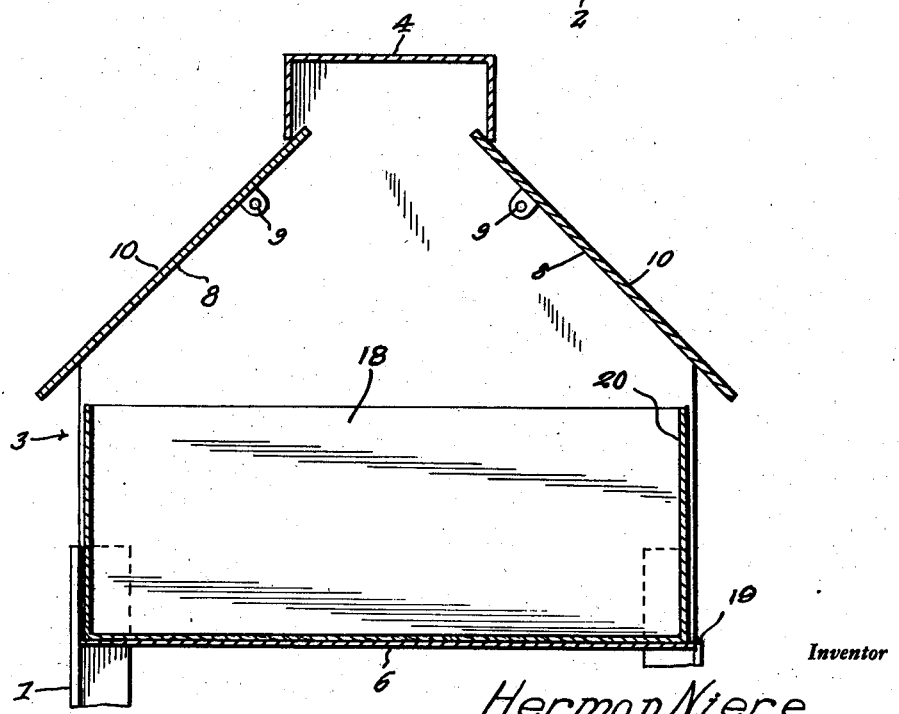
Figure 3 is a cross sectional view through the upper portion of the feeder, taken substantially on the line 3—3 of Figure 1.

Mounted in the upper portions of the angle iron legs 1 and rising therefrom is a housing which is designated generally by reference character 3. The housing 3 includes a bottom 6 from which end walls 5 rise, said end walls having oppositely inclined upper edge portions 8. Extending between the uppermost portions of the end walls 5 is an inverted channel-shaped top 4. As best seen in Figure 3 of the drawings, the housing 3 is open at its sides.

Journaled in suitable bearings 7 which are provided therefor on the end walls 5 adjacent the edges 8 thereof are shafts 9. Vertically swinging closures 10 are fixed on the shafts 9, said closures resting on the edges 8 of the end walls 5 when in lowered position. Arms 15 are fixed on the outer end portions of the shafts 9. The closures 10 are notched or recessed, as at 17 (see Fig. 4), to permit the upper portions of said closures to project upwardly beneath the top 4 of the housing 3 to provide a substantially rain tight closure to protect the feed adapted to be placed in the housing.

Removably mounted in the housing 3 and adapted to rest on the bottom 6 thereof is a trough 18. The side flanges of the angle iron legs 1 on one side of the housing 3 have their upper portions cut away at 19 to facilitate sliding the removable trough 18 laterally into and out of said housing. The lower end portions of the closures 10 overhang the side walls 20 of the trough 18 to prevent the entrance of water, dirt and other foreign matter.

Bars 11 are mounted on the legs 1 above the members 2 and in parallelism therewith. Treadles 12 are mounted for vertical swinging movement on the bars 11. The treadles 12 include bars 13 having one end portion pivotally connected to the end portions of the bars 11. Slats or planks 14 are mounted on the bars 13. The bars 13 extend inwardly and upwardly from the bars 11 adjacent the legs 1 and said bars 13 are connected by chains 16 to the arms 15. Thus, the closures 10 are connected to the treadles 12 for raising thereby to open position.

It is thought that the operation of the device will be readily apparent from a consideration of the foregoing. Briefly, the closures 10 normally rest in closed position on the edge portions 8 of the housing 3, said closures being sufficiently heavy to retain the treadles 12 in raised or elevated position. If necessary, weights may be provided on the free end portions of the closures 10. Feed may be placed in the trough 18 by opening the closures 10 or by sliding said trough laterally out of the housing 3. A fowl desiring to feed from the trough 18 mounts one of the treadles 12 which is depressed or swung downwardly under the weight of said fowl. Thus, the adjacent closure 10 is elevated to open position for permitting access to be had to the trough 18. When the fowl leaves the feeder and dismounts from the treadle 12, the closure 10 which has been opened returns by gravity to closed position and the treadle is again elevated.

From the foregoing it will now be seen that there is herein provided an improved chicken feeder provided with closure members adapted to protect the feed therein, which closures may be readily opened by the weight of a fowl; which may be readily filled, which is provided with a readily removable trough to facilitate the cleaning of the device, and which accomplishes all the objects of this invention and others, including many advantages of great practical utility and commercial importance. Although a preferred embodiment of the device is as illustrated and described, it is to be understood that changes in the details of construction and in the combination and arrangement of parts may be resorted to which will fall within the scope of the invention as claimed.

What is claimed is:

A poultry feeder of the character described comprising a plurality of supporting legs of angle iron, a housing mounted in the upper portions of the legs and rising therefrom, said housing being open on opposite sides, said housing including a bottom, end walls rising from the bottom and an inverted channel-shaped top extending between the upper portions of said end walls, pivots in said end walls, closures mounted for vertical swinging movement on said pivots and adapted to rest on the end walls when in closed position, said closures projecting upwardly beneath the top of the housing, a removable trough for the reception of feed, slidable laterally into and out of the housing through one of the open sides thereof and adapted to rest on the bottom of said housing, portions of certain of the angle iron supporting legs being cut away for the passage of said trough into and out of the housing, transverse bars secured to said supporting legs, treadles comprised of transverse members and longitudinally extending treadle members therebetween, pivotally mounted between the extremities of said bars on both sides of said housing, the inner extremities of said transverse treadle members terminating at points adjacent the longitudinal center line of said housing, but clear of the ends of said housing thereof, and arms secured to said pivots in said end walls and chains connecting the outer extremities of said arms with the inner extremities of said transverse treadle members, said chains being positioned exteriorly of the ends of the housing.

HERMAN NIERE.